United States Patent
Patel et al.

(10) Patent No.: US 10,963,345 B2
(45) Date of Patent: Mar. 30, 2021

(54) METHOD AND SYSTEM FOR A PROACTIVE HEALTH CHECK AND RECONSTRUCTION OF DATA

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/528,602

(22) Filed: Jul. 31, 2019

(65) Prior Publication Data
US 2021/0034459 A1 Feb. 4, 2021

(51) Int. Cl.
*G06F 11/10* (2006.01)
*G06F 11/14* (2006.01)

(52) U.S. Cl.
CPC ...... *G06F 11/1092* (2013.01); *G06F 11/1076* (2013.01); *G06F 11/1448* (2013.01); *G06F 11/1469* (2013.01)

(58) Field of Classification Search
CPC .................................................. G06F 11/1092
See application file for complete search history.

(56) References Cited

U.S. PATENT DOCUMENTS

| | | | |
|---|---|---|---|
| 4,780,809 A * | 10/1988 | Woffinden | G06F 11/1052 714/48 |
| 6,098,098 A | 8/2000 | Sandahl et al. | |
| 7,636,814 B1 * | 12/2009 | Karr | G06F 12/0804 711/143 |
| 7,987,353 B2 | 7/2011 | Holdaway et al. | |
| 8,099,571 B1 | 1/2012 | Driscoll et al. | |
| 8,161,255 B2 | 4/2012 | Anglin et al. | |
| 8,190,835 B1 | 5/2012 | Yueh | |
| 8,364,917 B2 | 1/2013 | Bricker et al. | |
| 8,386,930 B2 | 2/2013 | Dillenberger et al. | |

(Continued)

OTHER PUBLICATIONS

"Features—RoboHead"; Project Management Software for Marketing & Creative Teams, Aquent; 2018 (https://www.robohead.net/features) (2 pages).

(Continued)

*Primary Examiner* — Joseph D Torres
(74) *Attorney, Agent, or Firm* — Chamberlain, Hrdlicka, White, Williams & Aughtry

(57) ABSTRACT

In general, the invention relates to a method for managing data. The method includes identifying a first chunk to be health-checked in a fault domain using storage metadata stored in the fault domain, obtaining the chunk from the fault domain, generating, after obtaining the chunk, a first chunk identifier using the first chunk, making a determination that the first chunk identifier does not match a second chunk identifier stored in the storage metadata, and in response to the determination: obtaining a plurality of chunks associated with the first chunk from a plurality of fault domains, wherein the fault domain is not part of the plurality of fault domains, regenerating the first chunk using the plurality of chunks to generate a new first chunk, and storing the new first chunk in the fault domain.

14 Claims, 11 Drawing Sheets

(56) References Cited

U.S. PATENT DOCUMENTS

| | | |
|---|---|---|
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,185,624 B2 * | 1/2019 | Akutsu ............... H04L 67/1097 |
| 10,241,695 B2 * | 3/2019 | Baptist ................. G06F 3/0652 |
| 10,339,455 B1 | 7/2019 | Parush-Tzur et al. |
| 10,409,778 B1 | 9/2019 | Zhao et al. |
| 10,452,301 B1 | 10/2019 | Farhan et al. |
| 10,503,413 B1 | 12/2019 | Gal et al. |
| 10,503,611 B1 * | 12/2019 | Srivastav ............ H03M 13/154 |
| 2001/0044879 A1 * | 11/2001 | Moulton ................. H04L 69/40 711/114 |
| 2003/0058277 A1 | 3/2003 | Bowman-Amuah |
| 2003/0172145 A1 | 9/2003 | Nguyen |
| 2003/0177205 A1 | 9/2003 | Liang et al. |
| 2004/0128587 A1 * | 7/2004 | Kenchammana-Hosekote ............ H04L 69/40 714/43 |
| 2005/0076049 A1 | 4/2005 | Qubti et al. |
| 2007/0283011 A1 | 12/2007 | Rakowski et al. |
| 2008/0244204 A1 | 10/2008 | Cremelie et al. |
| 2009/0077165 A1 | 3/2009 | Rhodes et al. |
| 2009/0094250 A1 * | 4/2009 | Dhuse ................. G06F 11/1004 |
| 2009/0265360 A1 * | 10/2009 | Bachwani ............ G06F 11/008 |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0086006 A1 | 4/2013 | Colgrove et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0095596 A1 | 4/2015 | Yang et al. |
| 2015/0161000 A1 | 6/2015 | Kim et al. |
| 2015/0220400 A1 * | 8/2015 | Resch ................. G06F 11/1076 714/6.2 |
| 2015/0286545 A1 | 10/2015 | Brown et al. |
| 2015/0355980 A1 * | 12/2015 | Volvovski ............... G06F 16/21 707/674 |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1 | 4/2019 | Owen et al. |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0379588 A1 | 12/2019 | Rao |
| 2020/0050689 A1 | 2/2020 | Tal et al. |

OTHER PUBLICATIONS

"Make more time for the work that matters most"; Asana, Inc.; 2017 (https://asana.com/) (5 pages).

"Online Project Management Tools & Features"; ProWorkflow; Jun. 2015 (https://www.proworkflow.com/features-project-management-tools/) (7 pages).

Suzhen Wu et al.; "Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

Extended European Search Report issued in corresponding European Application No. 20152195.2, dated Jun. 2, 2020.

* cited by examiner

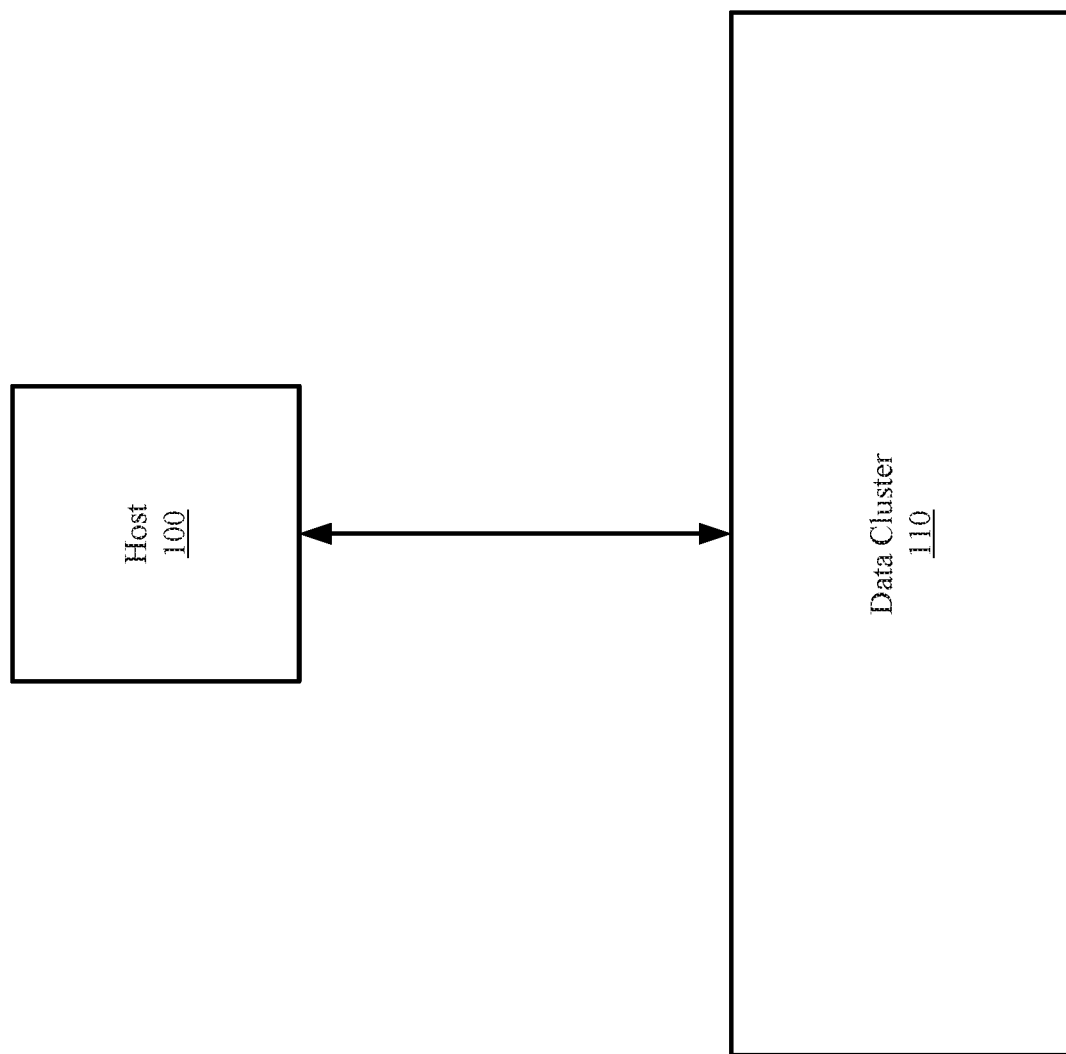

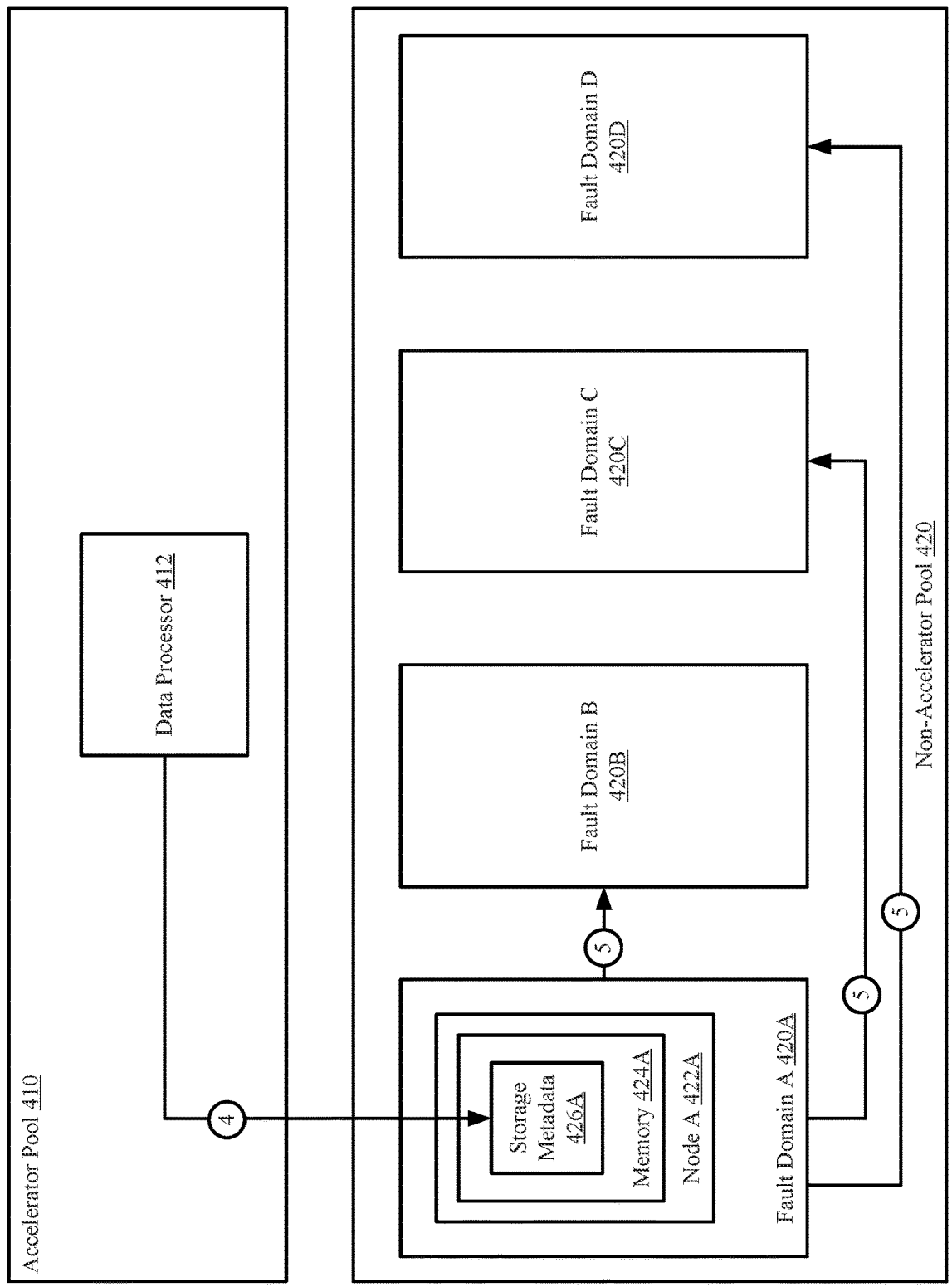

METHOD AND SYSTEM FOR A PROACTIVE HEALTH CHECK AND RECONSTRUCTION OF DATA

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing data. The method includes identifying a first chunk to be health-checked in a fault domain using storage metadata stored in the fault domain, obtaining the chunk from the fault domain, generating, after obtaining the chunk, a first chunk identifier using the first chunk, making a determination that the first chunk identifier does not match a second chunk identifier stored in the storage metadata, and in response to the determination: obtaining a plurality of chunks associated with the first chunk from a plurality of fault domains, wherein the fault domain is not part of the plurality of fault domains, regenerating the first chunk using the plurality of chunks to generate a new first chunk, and storing the new first chunk in the fault domain.

In general, in one aspect, the invention relates to a non-transitory computer readable medium which includes computer readable program code, which when executed by a computer processor enables the computer processor to perform a method for managing data. The method includes identifying a first chunk to be health-checked in a fault domain using storage metadata stored in the fault domain, obtaining the chunk from the fault domain, generating, after obtaining the chunk, a first chunk identifier using the first chunk, making a determination that the first chunk identifier does not match a second chunk identifier stored in the storage metadata, and in response to the determination: obtaining a plurality of chunks associated with the first chunk from a plurality of fault domains, wherein the fault domain is not part of the plurality of fault domains, regenerating the first chunk using the plurality of chunks to generate a new first chunk, and storing the new first chunk in the fault domain.

In general, in one aspect, the invention relates to a data cluster comprising a host and data nodes. A data node of the data nodes includes a processor and memory comprising instructions, which when executed by the processor perform a method for managing data. The method includes identifying a first chunk to be health-checked in a fault domain using storage metadata stored in the fault domain, obtaining the chunk from the fault domain, generating, after obtaining the chunk, a first chunk identifier using the first chunk, making a determination that the first chunk identifier does not match a second chunk identifier stored in the storage metadata, and in response to the determination: obtaining a plurality of chunks associated with the first chunk from a plurality of fault domains, wherein the fault domain is not part of the plurality of fault domains, regenerating the first chunk using the plurality of chunks to generate a new first chunk, and storing the new first chunk in the fault domain.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

FIGS. 4A-4C show an example in accordance with one or more embodiments of the invention.

DETAILED DESCRIPTION

Figure 1B:
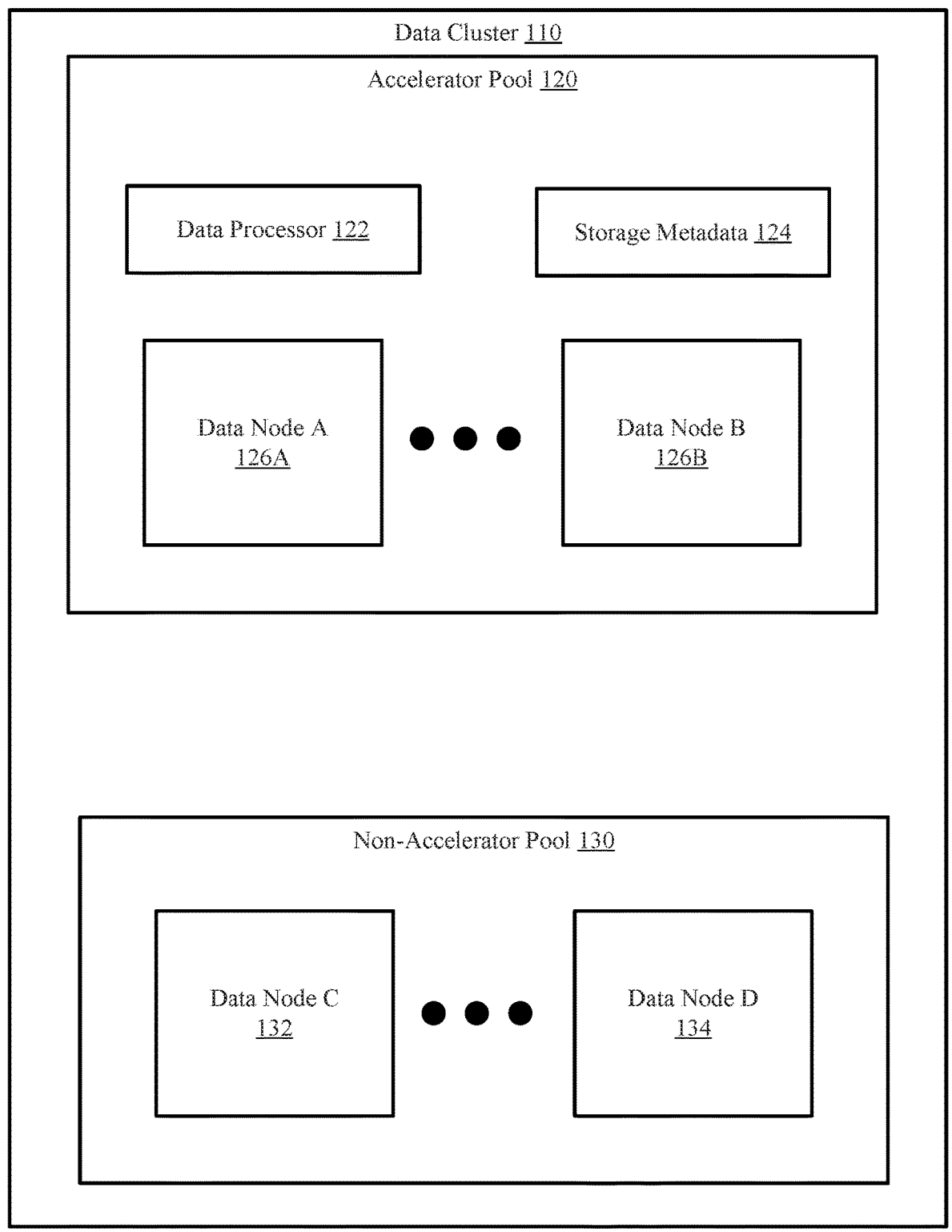
FIG. 1B shows a diagram of a data cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. Embodiments of the invention may utilize a data processor, operating in an accelerator pool, which applies an erasure coding procedure on data obtained from a host to divide the data into data chunks and to generate parity chunks using the data chunks. Optionally, the data processor may then perform deduplication on the data chunks to generate deduplicated data that includes deduplicated data chunks. The data chunks and the parity chunks (which may be deduplicated) are subsequently distributed to nodes in the data cluster in accordance with an erasure coding procedure.

In one or more embodiments of the invention, the accelerator pool stores storage metadata that specifies the nodes in which each data chunk and parity chunk is stored. The storage metadata may also be distributed to nodes in the non-accelerator pool. In this manner, if the storage metadata stored in the accelerator pool becomes unavailable, the storage metadata may be reconstructed using the storage metadata stored in the non-accelerator pool.

In one or more embodiments of the invention, each data node of the non-accelerator pool performs a periodic health-check on the data stored in the data node. The health-check may include identifying a data or parity chunk and determining whether the chunk is properly stored and accessible (or available) in the data node. If the data node determines that the chunk is not properly stored or accessible (or available), the data node may perform a reconstruction of the chunk using storage metadata and other chunks stored in other data nodes (which may be in the same or different fault domains) of the non-accelerator pool. Embodiments of the invention may further include updating the storage metadata in the accelerator pool synchronously or asynchronously based on the amount of required reconstruction.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
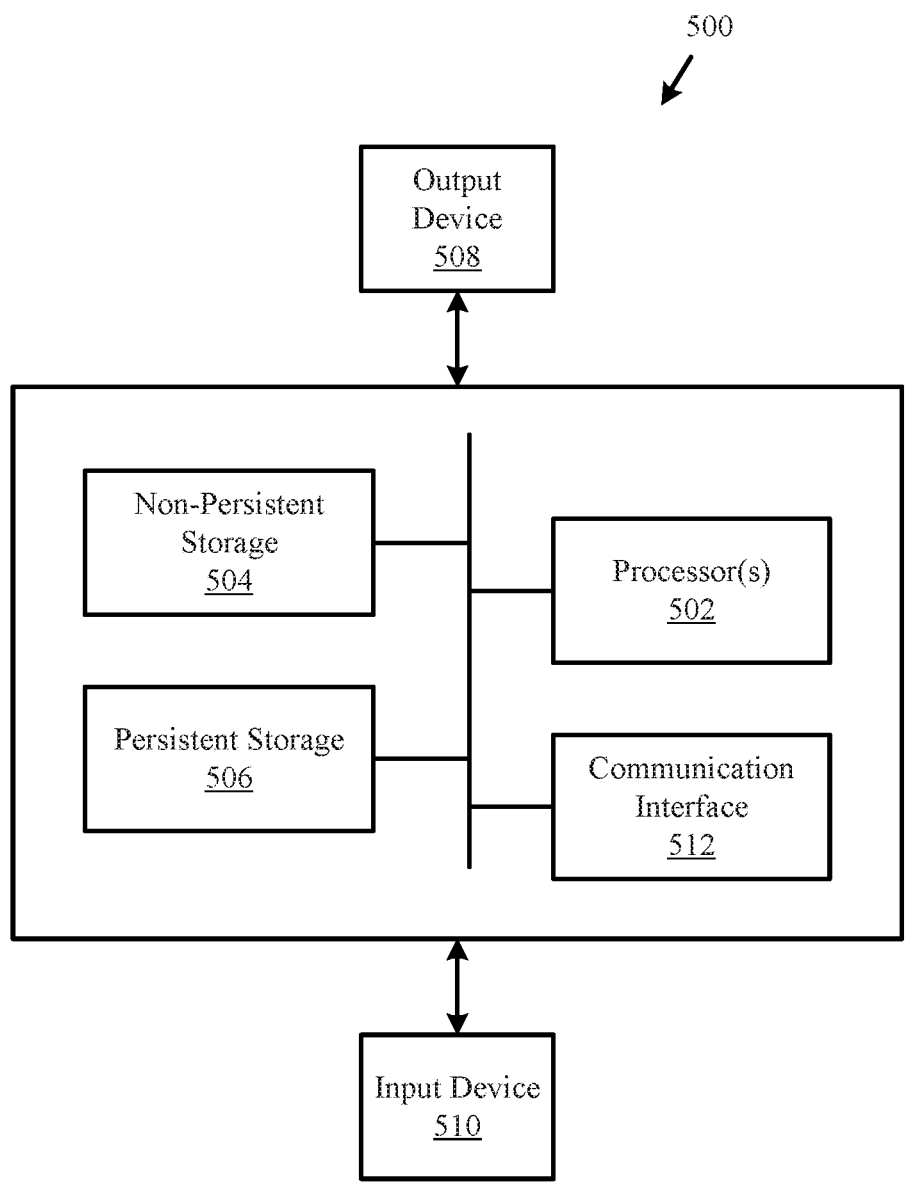
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the deduplicated data across nodes operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1A, the data cluster (110) may include nodes that each store any number of portions of data. The portions of data may be obtained by other nodes or obtained from the host (100). For additional details regarding the data cluster (110), see, e.g., FIG. 1B.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include an accelerator pool (120) and a non-accelerator pool (130). The accelerator pool (120) may include a data processor (122) and any number of data nodes (126A, 126B). Similarly, the non-accelerator pool (130) includes any number of data nodes (132, 134). The components of the data cluster (110A) may be operably connected via any combination of wired and/or wireless connections. Each of the aforementioned components is discussed below.

In one or more embodiments of the invention, the data processor (122) is a device that includes functionality to perform deduplication on data obtained from a host (e.g., 100, FIG. 1A). The data processor (122) may generate, utilize, and update storage metadata (124) (as described in FIG. 2) as part of its deduplication functionality. In one or more embodiments of the invention, the storage metadata (124) is a data structure that stores unique identifiers of portions data stored in the data cluster (110A). The unique identifiers stored in the storage metadata (124) may be used to determine whether a data chunk of the obtained data is already present elsewhere in the accelerator pool (120) or the non-accelerator pool (130). The data processor (122) may use the storage information to perform the deduplication and generate deduplicated data. After deduplication, an erasure coding procedure may be performed on the deduplicated data in order to generate parity chunks. The data processor (122) may perform the deduplication and erasure coding procedure via the method illustrated in FIG. 3A.

In one or more embodiments of the invention, the storage metadata (124) is stored in a data node (126A, 126B) of the accelerator pool (120). A copy of the storage metadata (124) may be distributed to one or more data nodes (132, 134) of the non-accelerator pool (130). In this manner, if the storage metadata (124) stored in the accelerator pool (120) experiences a failure (e.g., it becomes unavailable, corrupted, etc.), the storage metadata (124) may be reconstructed using the copies of storage metadata stored in the non-accelerator pool (130). For additional detail regarding the distribution on storage metadata, see e.g., FIG. 3A.

Figure 3A:
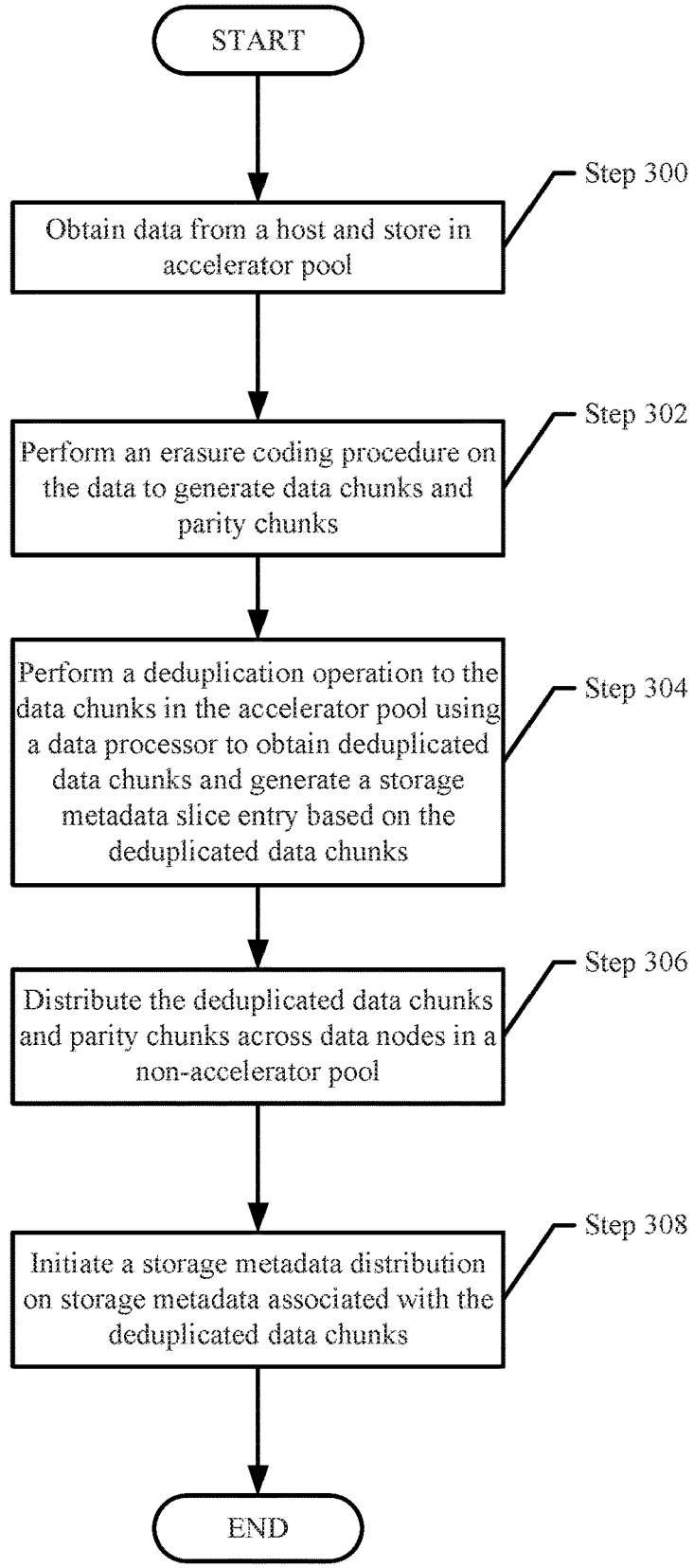
FIG. 3A shows a flowchart for storing data in a data cluster in accordance with one or more embodiments of the invention.

In one or more of embodiments of the invention, the data processor (122) is implemented as computer instructions, e.g., computer code, stored on a persistent storage that when executed by a processor of a data node (e.g., 126A, 126B) of the accelerator pool (120) cause the data node to provide the aforementioned functionality of the data processor (122) described throughout this application and/or all, or a portion thereof, of the method illustrated in FIG. 3A.

In one or more embodiments of the invention, the data processor (122) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (122) described throughout this application and/or all, or a portion thereof, of the method illustrated in FIG. 3A.

In one or more embodiments of the invention, the data processor (122) is implemented as a logical device. The logical device may utilize the computing resources of any number of computing devices and thereby provide the functionality of the data processor (122) described throughout this application and/or all, or a portion thereof, of the method illustrated in FIG. 3A.

Continuing with the discussion of FIG. 1B, different data nodes in the cluster may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into: (i) an accelerator pool (120) including nodes that have more computing resources, e.g., high performance nodes (126A, 126B), than other nodes and (ii) a non-accelerator pool (130) including nodes that have fewer computing resources, e.g., low performance nodes (132, 134) than the nodes in the accelerator pool (120). For example, nodes of the accelerator pool (120) may include enterprise-class solid state storage resources that provide very high storage bandwidth, low latency, and high input-outputs per second (IOPS). In contrast, the nodes of the non-accelerator pool (130) may include hard disk drives that provide lower storage performance. While illustrated in FIG. 1B as being divided into two groups, the nodes may be divided into any number of groupings based on the relative performance level of each node without departing from the invention.

In one or more embodiments of the invention, the data nodes (126A, 126B, 132, 134) store data chunks and parity chunks along with storage metadata (as described below). The data nodes (126A, 126B, 132, 134) may include persistent storage that may be used to store the data chunks, parity chunks and storage metadata. The generation of the data chunks and parity chunks as well as the storage metadata is described below with respect to FIG. 3A. For additional details regarding the data nodes (126A, 126B, 132, 134), see, e.g., FIG. 1C.

In one or more embodiments of the invention, the non-accelerator pool (130) includes any number of fault domains. In one or more embodiments of the invention, a fault domain is a logical grouping of nodes (e.g., data nodes) that, when one node of the logical grouping of nodes goes offline and/or otherwise becomes inaccessible, the other nodes in the same logical grouping of nodes are directly affected. However, nodes in a different fault domain may be unaffected. For additional details regarding fault domains, see, e.g. FIG. 1E.

In one or more embodiments of the invention, each data node (126A, 126B, 132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (126A, 126B, 132, 134) described throughout this application and/or all, or a portion thereof, of the method illustrated in FIGS. 3A-3B.

In one or more embodiments of the invention, each of the data nodes (126A, 126B, 132, 134) are implemented as a logical device. The logical device may utilize the computing resources of any number of computing devices and thereby provide the functionality of the data nodes (126A, 126B, 132, 134) described throughout this application and/or all, or a portion thereof, of the method illustrated in FIGS. 3A-3B. For additional details regarding the data nodes (126A, 126B, 132, 134), see, e.g., FIG. 1C.

Figure 1C:
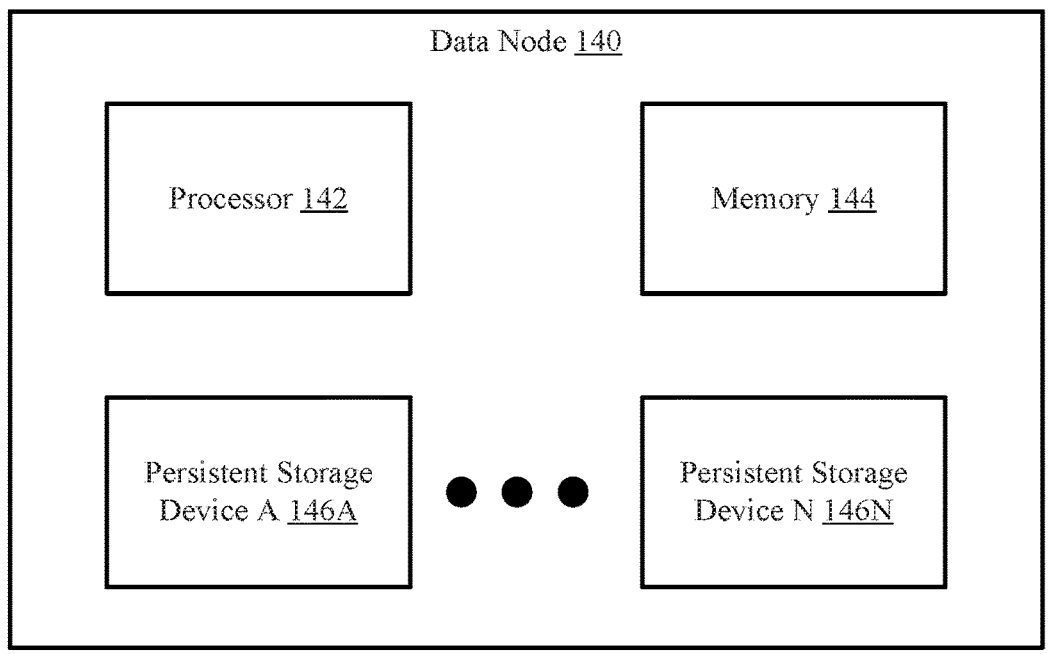
FIG. 1C shows a diagram of a data node in accordance with one or more embodiments of the invention.

FIG. 1C shows a diagram of a data node (140) in accordance with one or more embodiments of the invention. The data node (140) may be an embodiment of a data node (126A, 126B, 132, 134, FIG. 1B) discussed above. Each data node may be equipped with a processor (142), memory (144), and one or more persistent storage devices (146A, 146N). Each component of the data node (140) may be operatively connected to each other via wired and/or wireless connections. The data node (140) may have additional, fewer, and/or different components without departing from the invention. Each of the illustrated components of the data node (140) is discussed below.

In one or more embodiments of the invention, the processor (142) is a component that processes data and processes of requests. The processor (142) may be, for example, a central processing unit (CPU). The processor may process a request to rebuild data and/or metadata using data stored in memory (144) and/or the persistent storage devices (146A, 146N). The processor (142) may process other requests without departing from the invention.

In one or more embodiments of the invention, the data node includes memory (144), which stores data that is more accessible to the processor (142) than the persistent storage devices (146A, 146N). The memory (144) may be volatile storage. Volatile storage may be storage that stores data that is lost when the storage loses power. The memory may be, for example, Random Access Memory (RAM). In one or more embodiments of the invention, a copy of the storage metadata discussed in FIG. 1B is stored in the memory (144) of the data node (140).

In one or more embodiments of the invention, the persistent storage devices (146A, 146N) store data. The data may be data chunks and/or parity chunks. In addition, the data may also include storage metadata. The persistent storage devices (146A, 146N) may be non-volatile storage. In other words, the data stored in the persistent storage devices (146A, 146N) is not lost or removed when the persistent storage devices (146A, 146N) lose power. Each of the persistent storage devices (146A, 146N) may be, for example, solid state drives, hard disk drives, and/or tape drives. The persistent storage devices may include other types of non-volatile or non-transitory storage mediums without departing from the invention. For additional details regarding the persistent storage devices, see, e.g., FIG. 1D.

Figure 1D:
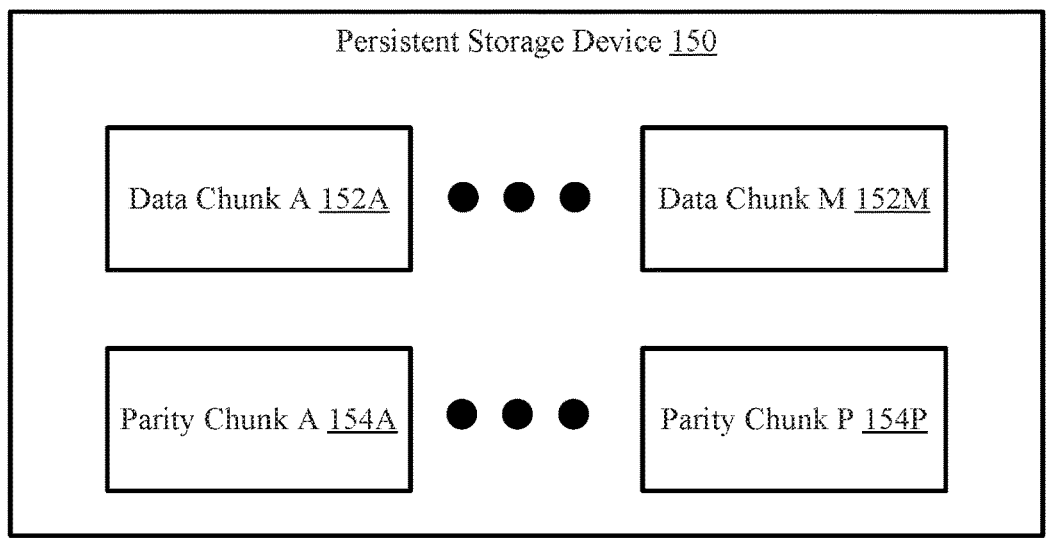
FIG. 1D shows a diagram of persistent storage in accordance with one or more embodiments of the invention.

FIG. 1D shows a diagram of a persistent storage device. The persistent storage device (150) may be an embodiment of a persistent storage device (146A, 146N) discussed above. As discussed above, the persistent storage device (150) stores data. The data may be data chunks (152A, 152M) and parity chunks (154A, 154P). Though not shown in FIG. 1D, the data may also include storage metadata.

In one or more embodiments of the invention, a data chunk (152A, 152M) is a data structure that includes a portion of data that was obtained from a host. The data chunks (152A, 152M) may be (but are not required to be) deduplicated by a data processor and obtained by the data node (140) from the data processor. Each of the data chunks (152A, 152M) may be used by the data node (140) (or another data node) to reconstruct another data chunk or a parity chunk based on an erasure coding algorithm that was applied to the other data chunk or parity chunk.

In one or more embodiments of the invention, a parity chunk (154A, 154P) is a data structure that includes a parity value generated using an erasure coding algorithm. The parity value may be generated by applying the erasure coding algorithm to one or more data chunks stored in the data node (140) or other data nodes. Each of the parity chunks (154A, 154P) may be used by the data node (140) (or another data node) to reconstruct another parity chunk or a data chunk based on an erasure coding algorithm that was applied to the other parity chunk or data chunk.

Figure 1E:
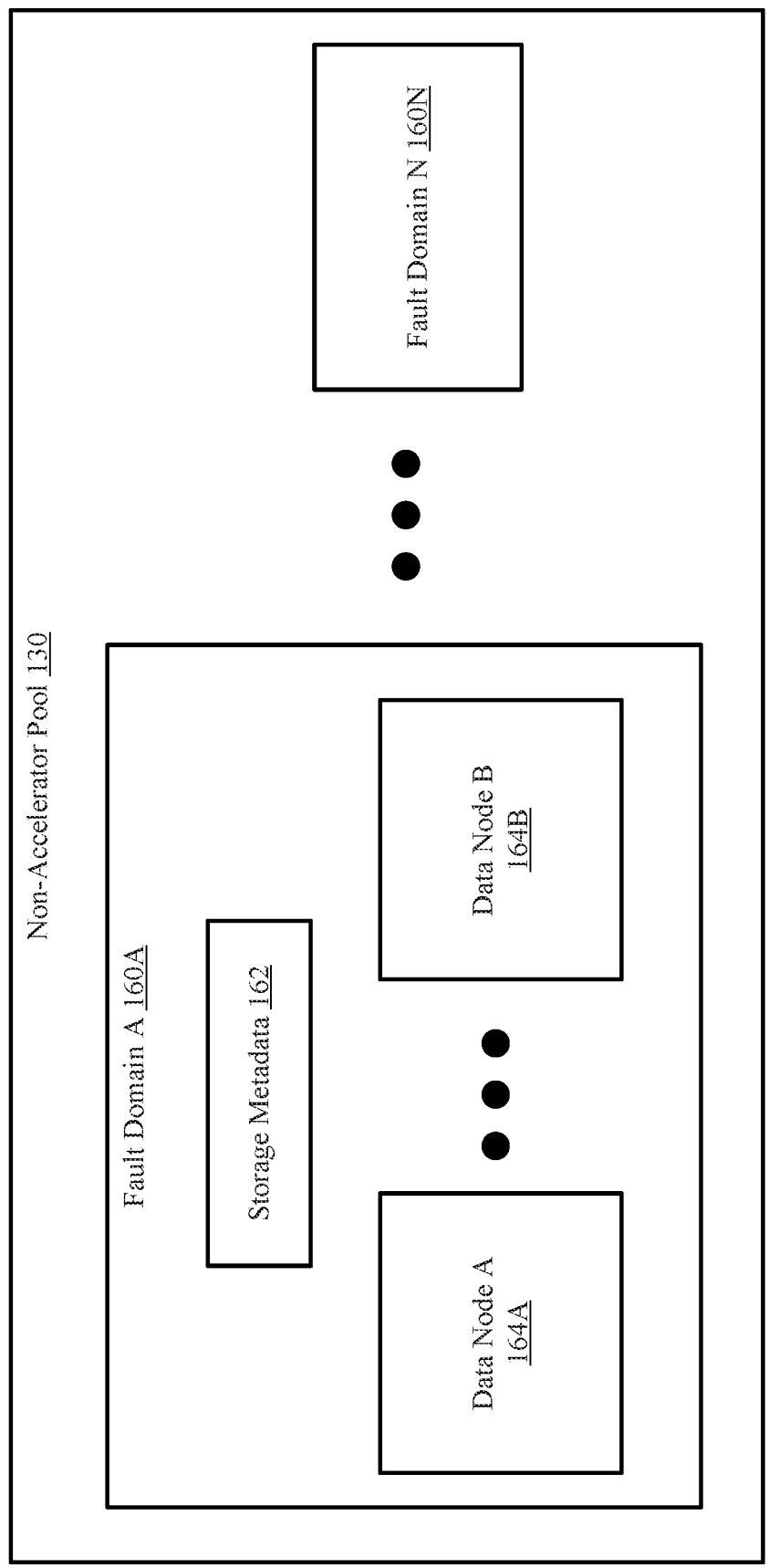
FIG. 1E shows a diagram of a non-accelerator pool in accordance with one or more embodiments of the invention.

FIG. 1E shows a diagram of a non-accelerator pool in accordance with one or more embodiments of the invention. The non-accelerator pool (130A) is an embodiment of the non-accelerator pool (130, FIG. 1B) discussed above. The non-accelerator pool (130A) may include any number of fault domains (160A, 160N).

As discussed above, a fault domain (160A, 160N) is a logical grouping of data nodes (164A, 164B) that, when one data node of the logical grouping of data nodes goes offline and/or otherwise becomes inaccessible, the other nodes in the logical grouping of nodes are directly affected. The effect of the node going offline to the other nodes may include the other nodes also going offline and/or otherwise inaccessible. The non-accelerator pool (130) may include multiple fault domains. In this manner, the events of one fault domain in the non-accelerator pool (130) may have no effect on other fault domains in the non-accelerator pool (130).

For example, two data nodes may be in a first fault domain (e.g., 160A). If one of these data nodes in the first fault domain (160A) experiences an unexpected shutdown, other nodes in the first fault domain may be affected. In contrast, another data node in a second fault domain may not be affected by the unexpected shutdown of a data node in the first fault domain. In one or more embodiments of the invention, the unexpected shutdown of one fault domain does not affect the nodes of other fault domains. In this manner, data may be replicated and stored across multiple fault domains to allow high availability of the data.

As discussed above, the data chunks and parity chunks of a data slice (e.g., generated using the erasure coding described in FIG. 3A) may be stored in different fault domains (160A, 160N). Storing the data chunks and parity chunks in multiple fault domains may be for recovery purposes. In the event that one or more fault domains storing data chunks or parity chunks become inaccessible, the data chunks and/or parity chunks stored in the remaining fault domains may be used to recreate the inaccessible data. In one embodiment of the invention, as part of (or in addition to) the chunk metadata, the storage metadata (162) tracks the members of each data slice (i.e., which data chunks and which parity chunks are part of a data slice). This information may be used to aid in any recover operation that is required to be performed on the data stored in the data cluster.

In one or more embodiments of the invention, each fault domain (160A, 160N) stores a copy of storage metadata (162) obtained from a non-accelerator pool and/or from another fault domain (160A, 160N) distributing a copy of the storage metadata. The copy of storage metadata (162) in a fault domain may be stored in one or more data nodes (164A, 164B) of the fault domain. The copy of storage metadata (162) may be stored in any other computing device associated with the fault domain without departing from the invention.

Figure 2:
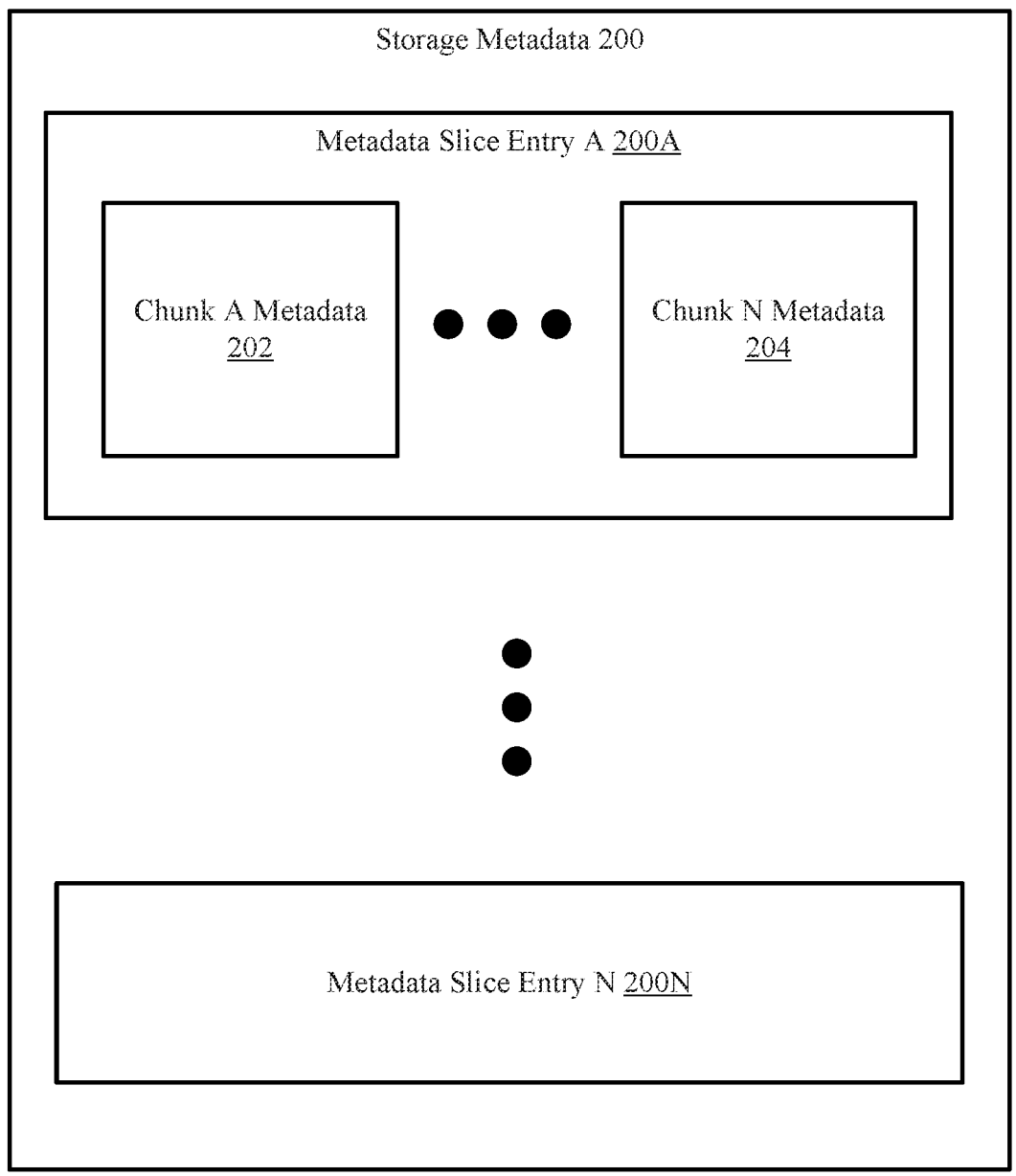
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (124, FIG. 1B; 162, FIG. 1E) discussed above. As discussed above, the storage metadata (200) stores information about data chunks or parity chunks (collectively, chunks). The storage information may include one or more metadata slice entries (200A, 200N). Each metadata slice entry (200A, 200N) may include chunk metadata (202, 204). Each of the aforementioned portions of the storage metadata (200) is discussed below.

In one or more embodiments of the invention, a metadata slice entry (200A, 200N) is an entry that specifies metadata associated with chunks of a data slice. The metadata slice entry (200A, 200N) includes chunk metadata (202, 204). Each chunk of a chunk metadata (202, 204) may correspond to metadata for a data chunk or a parity chunk. Each chunk metadata (202, 204) may include information about a chunk such as, for example, a unique identifier (e.g., a fingerprint) and a storage location of the chunk, e.g., the non-accelerator pool. The unique identifier of a chunk may be generated using the chunk (e.g., calculated using the data of the chunk).

FIG. 3A shows a flowchart for storing data in a data cluster in accordance with one or more embodiments of the invention. The method shown in FIG. 3A may be performed by, for example, a data processor (122, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, data is obtained from a host. The data may be a file, a file segment, a collection of files, or any other type of data without departing from the invention.

In step 302, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention.

Continuing with the above discussion, if the erasing code procedure is implementing RAID-3, then a single parity value is calculated. The resulting parity value is then stored in a parity chunk. If erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g_0 \cdot D_0 + g_1 \cdot D_1 + g_2 D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In step 304, deduplication is performed on the data chunks to obtain deduplicated data chunks. Additionally, a storage metadata slice entry is generated based on the deduplication data chunks and the parity chunks. In one or more embodiments of the invention, the deduplication is performed in the accelerator pool by identifying the data chunks of the obtained data and assigning a fingerprint to each data chunk. A fingerprint is a unique identifier that may be stored in metadata of the data chunk. The data processor performing the deduplication may generate a fingerprint for a data chunk and identify whether the fingerprint matches an existing fingerprint stored in storage metadata stored in the accelerator pool. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each deduplicated data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 306, the deduplicated data chunks and parity chunk(s) are stored across data nodes in different fault domains in a non-accelerator pool. As discussed above, the deduplicated data chunks and the parity chunk(s) are stored in a manner that minimizes reads and writes from the non-accelerator pool. In one embodiment of the invention, this minimization is achieved by storing data chunks and parity chunks, which are collective referred to as a data slice (or slice), in the same manner as a prior version of the data slice. The data processor may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a data slice (as opposed to a modification to an existing/previously stored data slice), then the deduplicated data chunks and parity chunks may be stored across the data nodes (each in a different fault domain) in the non-accelerator pool. The location in which the data chunk or parity chunk is stored is tracked using the storage metadata. The scenario does not require the data processor to use location information for previously stored data chunks and parity chunks.

However, if the deduplicated data chunks and parity chunks are the second version of a slice (e.g., a modification to a previously stored slice), then the deduplicated data chunks and parity chunks are stored across the nodes (each in a different fault domain) in the non-accelerator pool using prior stored location information. The information about the location in which the data chunk or parity chunk for the second version of the slice is stored in the storage metadata.

For example, consider a scenario in which the first version of the slice includes three data chunks (D1, D2, D3) and one parity chunk (P1) that were stored as follows: Data Node 1 stores D1, Data Node 2 stores D2, Data Node 3 stores D3, and Data Node 4 stores P1. Further, in this example, a second version of the slice is received that includes three data chunks (D1, D2', D3) and one newly calculated parity chunk (P1'). After deduplication only D2' and Pr need to be stored. Based on the prior storage locations (also referred to as locations) of the data chunks (D1, D2, and D3) and parity chunks (P1) for the first version of the slice, D2' is stored on Node 2 and Pr is stored on Node 4. By storing the D2' on Node 2 and Pr on Node 4 the data chunks and parity chunks associated with the second slice satisfy the condition that all data chunks and parity chunks for the second version of the slice are being stored in separate fault domains. If the location information was not taken into account, then the entire slice (i.e., D1, D2', D3, and P1') would need to be stored in order to guarantee that the requirement that all data chunks and parity chunks for the second version of the slice are being stored in separate fault domains is satisfied.

In one or more embodiments of the invention, if the data node that obtains the deduplicated data chunk, which is a modified version of a prior stored deduplicated data chunk, then the data node may: (i) store the modified version of the deduplicated data chunk (i.e., the data node would include two versions of the data chunk) or (ii) store the modified version of the deduplicated data chunk and delete the prior version of the deduplicated data chunk.

In one embodiment of the invention, the data processor includes functionality to determine whether a given data chunk is a modified version of a previously stored data chunk. Said another way, after the data is received from a host divided into data chunks and grouped into slices, the data processor includes functionality to determine whether a slice is a modified version of a prior stored slice. The data processor may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 308, a storage metadata distribution on storage metadata is initiated. In one or more embodiments of the invention, the storage metadata is distributed by generating a copy of the storage metadata that includes the storage metadata slice entry generated in step 304 and sending the copy of storage metadata in the non-accelerator pool.

In one or more embodiments of the invention, the copy of storage metadata is sent to a data node of a fault domain by the data processor. The data processor may further instruct the data node to distribute the copy of storage metadata to other data nodes in the fault domain or to other data nodes in other fault domains. In this manner, a copy of the storage metadata is stored in multiple fault domains in the event of a storage metadata failure.

In one or more embodiments of the invention, the copy of storage metadata is sent to multiple fault domains by the data processor. The data processor may send a copy of storage metadata to one or more data nodes of each of the multiple fault domains. In this manner, a copy of the storage metadata is stored in multiple fault domains in the event of a storage metadata failure.

While FIG. 3A describes erasure coding and deduplicating the data, embodiments of the invention may be implemented where the data is only erasure coded and not deduplicated. In such embodiments, step 304 includes generating a storage metadata slice using non-deduplicated data chunks and parity chunks and step 306 includes distributing non-deduplicated data chunks and parity chunks.

Figure 3B:
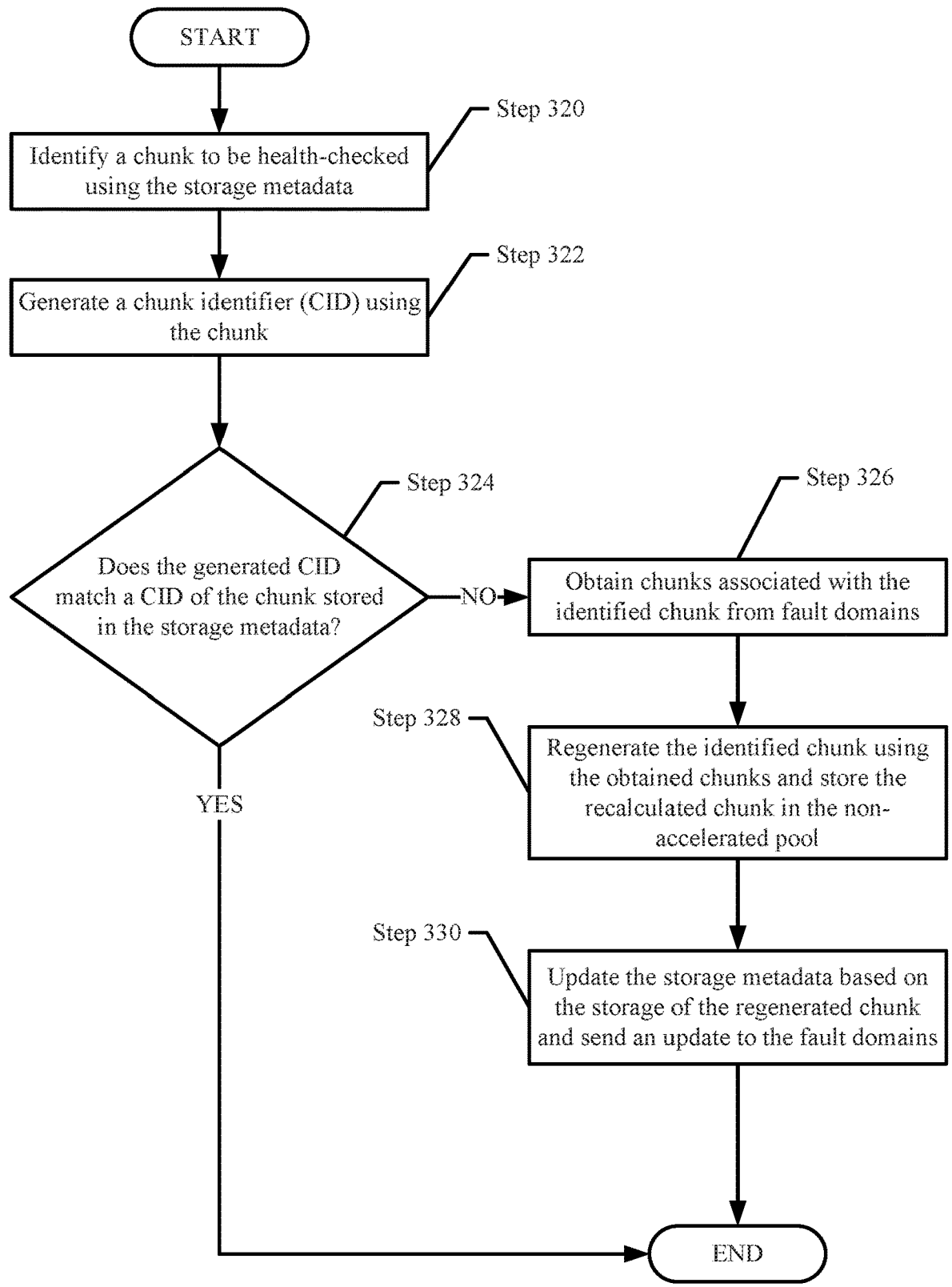
FIG. 3B shows a flowchart for managing data in accordance with one or more embodiments of the invention.

FIG. 3B shows a flowchart for managing data in accordance with one or more embodiments of the invention. The method shown in FIG. 3B may be performed by, for example, a data node (132, 134, FIG. 1B) of a non-accelerator pool. Other components of the system illustrated in FIG. 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Continuing with the discussion of FIG. 3B, in step 320, a chunk to be health-checked is identified using the storage metadata. In one or more embodiments of the invention, the data node may select a chunk (e.g., a data chunk or a parity chunk) stored in a persistent storage device of the data node based on a policy implemented by the data node to health-check the chunk periodically (e.g., once every hour, once a day, once a week, etc.). The data node may use the storage metadata to identify a storage location of the chunk and/or obtain the chunk from the persistent storage device.

In step 322, the chunk is read (or obtained) from persistent storage from the location specified in the storage metadata and a chunk identifier (CID) for the chunk is generated using the obtained data. The CID is generated by performing a function on the chunk to obtain a unique identifier (e.g., a fingerprint) that is generated based on the content of the data in the chunk. The result is a generated CID.

In one or more embodiments of the invention, the function performed on the data is a hash function. The data node may perform a hash function on the chunk to obtain a hash value. The hash value may be used as the generated CID. Other functions may be used to generate the CID without departing from the invention.

In step 324, the data node compares the generated CID to a CID associated with the chunk stored in the storage metadata. After comparing the generated CID to a CID of the storage metadata, a determination is made about whether the generated CID matches the CID of the storage metadata. If the generated CID matches the CID of the storage metadata, the method ends following step 324; otherwise, the method proceeds to step 326.

In one or more embodiments of the invention, the determination that the generated CID does not match the CID of the storage metadata implies an unavailability of the chunk. The chunk may be unavailable when the data stored at the location specified in the storage metadata for the chunk is corrupted or when the chunk is inaccessible (i.e., the data node is unable to access the chunk).

In step 326, chunks associated with the identified chunk (i.e., the chunk identified in Step 326) are obtained from other fault domains. In one or more embodiments of the invention, each chunk is associated with a metadata slice in the storage. Accordingly, the identified chunks correspond to the other chunks in the metadata slice that includes the identified chunk.

As discussed above, the storage metadata slice may specify chunk metadata for other chunks of the data slice. The chunk metadata for the other chunks may include a storage location for each of the other chunks. Specifically, the storage location of a chunk may specify, for example, a fault domain, a data node of the fault domain, and/or a persistent storage device of the data node in which the chunk is stored. The data node may use the chunk metadata of the other chunks to obtain the other chunks. Obtaining the other chunks may include sending a request to each of the data nodes storing the other chunks. The data nodes may respond by sending the requested chunks to the data node.

In step 328, the identified chunk is regenerated using the obtained chunks and stored in the non-accelerated pool. In one or more embodiments of the invention, the identified chunk is regenerated using the erasure coding algorithm applied to the data chunks and parity chunks of the data slice. The erasure coding algorithm may be applied to the other chunks (a portion of which may be data chunks while the other portion may be parity chunks that were generated using the erasure coding procedure) to regenerate a chunk.

In step 330, the storage metadata is updated based on the storage of the regenerated chunk, and an update is sent to the fault domains. In one or more embodiments of the invention, the storage metadata is updated by updating the chunk metadata of the metadata slice entry associated with the regenerated chunk with the new storage location of the regenerated chunk. Additionally, if the CID of the regenerated chunk has changed, the chunk metadata is further updated with the new CID.

In one or more embodiments of the invention, the update is further sent to the storage metadata in the accelerator pool. In this manner, the storage metadata is consistent throughout the accelerator pool and the fault domains in the non-accelerator pool.

The process shown in FIG. 3B may be concurrently performed by each of the data nodes. Further, each of the data nodes may perform the method shown in FIG. 3B continuously and/or periodically.

Example

Figure 4A:
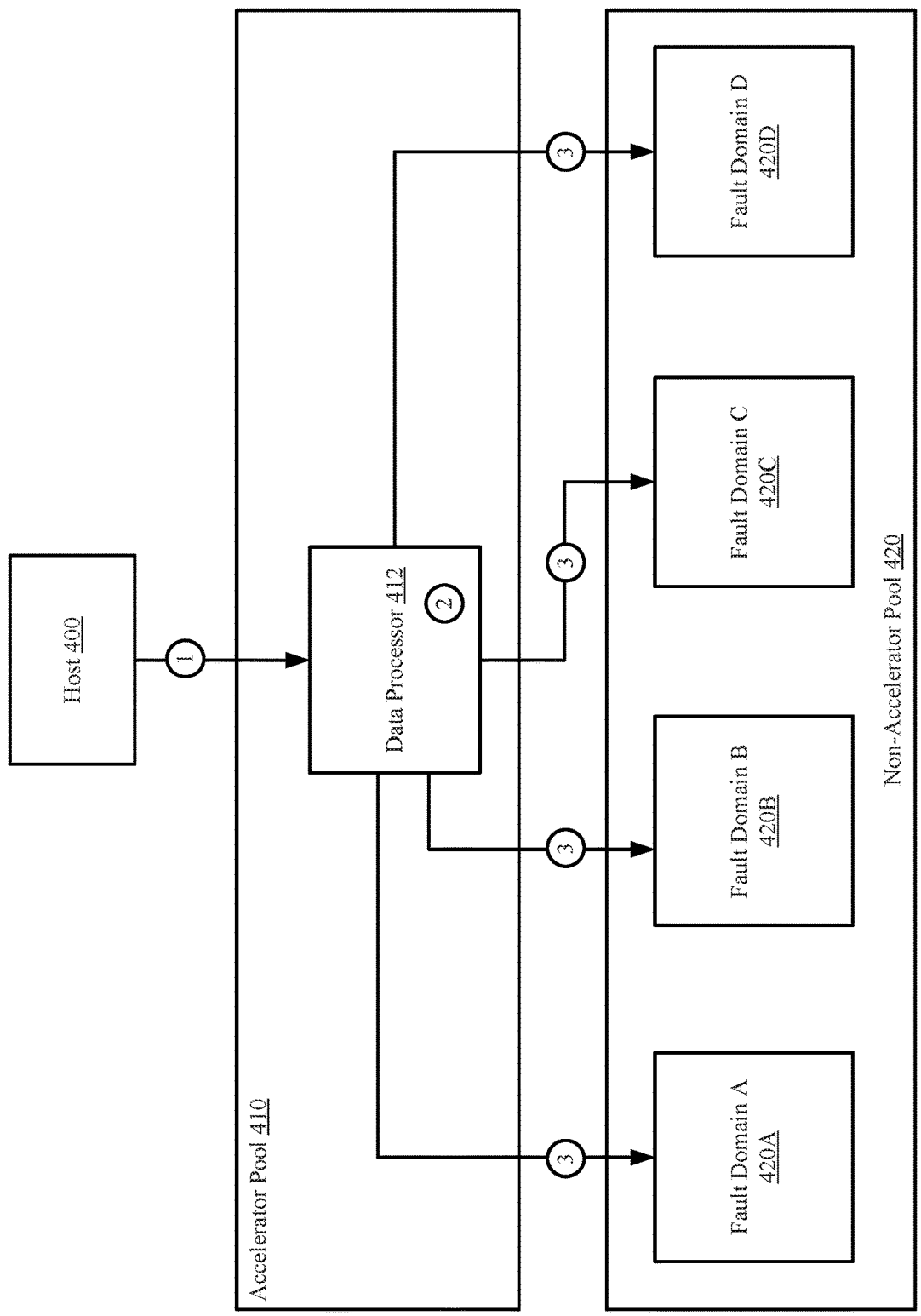
Figure 4C:
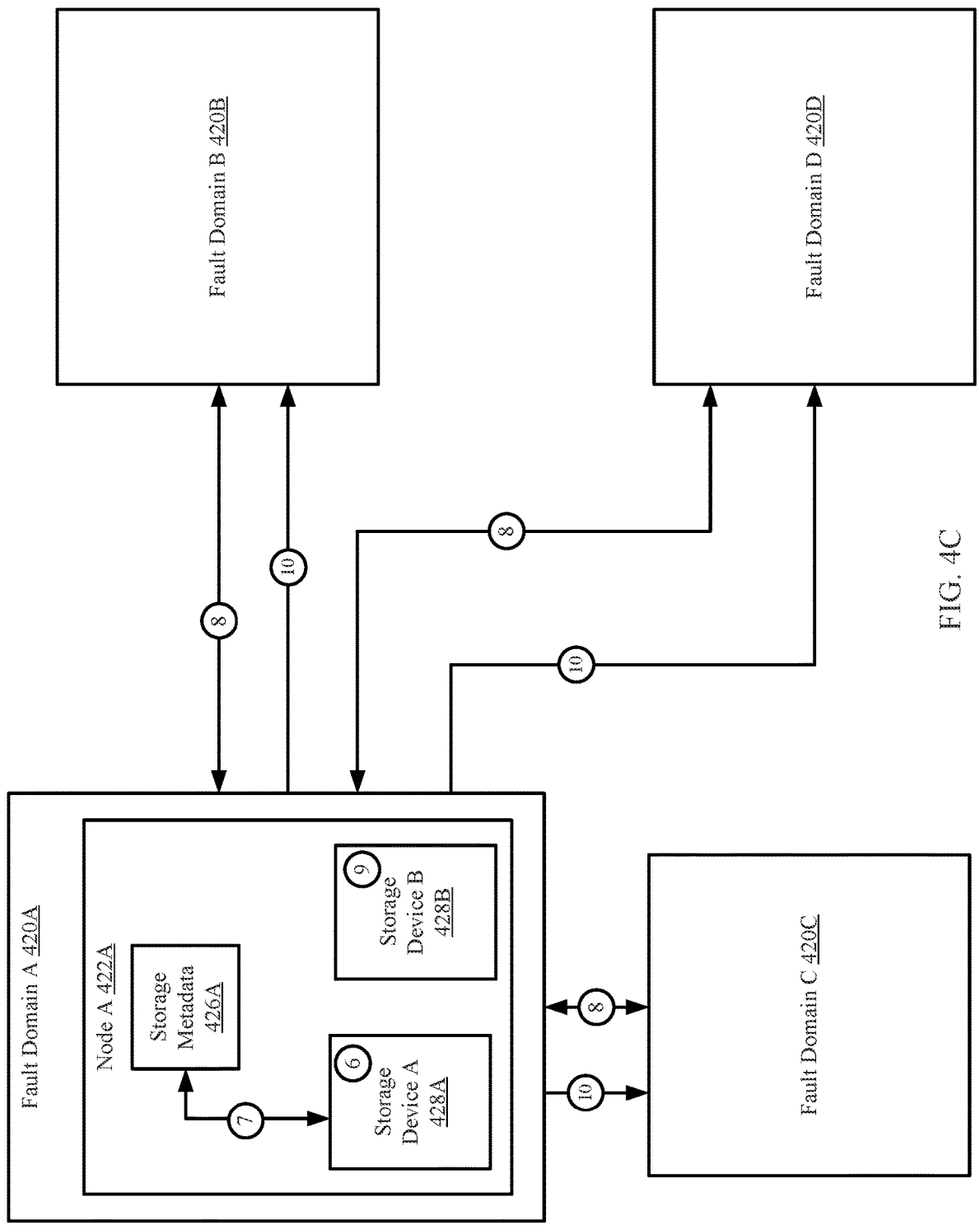

The following section describes an example. The example is not intended to limit the invention. The example is illustrated in FIGS. 4A-4C. Turning to the example, consider a scenario in which a data cluster obtains data from a host. The data is a file. The host requests the file be stored in the data cluster using a 3:1 erasure coding procedure. FIG. 4A shows a diagram a system in accordance with one or more embodiments of the invention. The host (400) sends the request to a data processor (412) of an accelerator pool (410) [1].

The data processor (412) performs the method of FIG. 3A to store the obtained file. Specifically, the data processor performs an erasure coding on the file [2]. In this example, assume that the erasure coding procedure includes implementing RAID 3. The result of the erasure coding procedure is a group of three data chunks and a parity chunk. The data chunks and parity chunk then undergo a deduplication operation to obtain deduplicated data chunks. Because this file is not part of a previously-stored file, all three data chunks are deduplicated data chunks and, as such, all need to be stored in the non-accelerator pool.

The deduplicated data chunks and the parity chunk are stored in the non-accelerator pool (420) [3]. Specifically, each of the three deduplicated data chunk and the parity chunk is stored in a unique fault domain. In other words, a first deduplicated data chunk is stored in fault domain A (420A), a second deduplicated data chunk is stored in fault domain B (420B), a third deduplicated data chunk is stored in fault domain C (420C), and the parity chunk is stored in fault domain D (420D).

In addition to storing the deduplicated data chunks and the parity chunks, the data processor generates a storage metadata slice entry in storage metadata stored in the accelerator pool. A unique identifier (e.g., a CID) of each deduplicated data chunk and parity chunk, along with their location, is stored in storage metadata slice entry.

FIG. 4B shows a second diagram of the example system. Continuing with the example, a copy of the storage metadata is sent to a data node (422A) of fault domain A (420A) [4]. The data node (422A) then stores copy of the storage metadata (426A) in memory (424A) of the data node (422A). Further, the data node (422A) distributes a copy of the storage metadata (426A) to the other fault domains (420B, 420C, 420D) [5].

FIG. 4C shows a diagram of the example system at a third point in time.

Continuing with the example, a node (422A) of fault domain A (420A) selects a data chunk stored in a storage device A (428A) to be health-checked using the storage metadata (426A) stored in the node (422A) [6]. The node (422A) obtains the data chunk and generates a chunk ID (CID) by applying a hash function to the data chunk. The generated CID is compared to a CID of the storage metadata (426A) associated with the data chunk, and based on the comparison, a determination is made that the two CIDs do not match and therefore the data chunk is corrupted.

Based on the determination, the data node (422A) sends a request to data nodes of the other fault domains (420B, 420C, 420D) to obtain chunks of a data slice associated with the corrupted data chunk [8]. The data node (422A) uses the storage metadata (426A) to determine where the other chunks are stored in the fault domains (420B, 420C, 420D).

After the other chunks are obtained, the data node (422A) performs a reconstruction of the data chunk using a processor of the data node (422A). The reconstructed data chunk is stored in a second storage device (428B) of the data node (422A) [9]. Further, the storage metadata (426A) is updated with the new storage location of the reconstructed data chunk. The update to the storage metadata (426A) is then distributed to the fault domains (420B, 420C, 420D) so that the storage metadata stored in the other fault domains (420B, 420C, 420D) may specify the new storage location of the reconstructed data chunk [10].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of storing data in a data cluster. The reliability is improved by performing periodic health-checks on portions of data stored in the data cluster in a manner that distributes the health-checking across the data nodes. The distribution of health-checks enables health-checks to be readily performed across all data nodes with minimal impact on the performance of the data nodes as each data node is only performing health-checks its own stored chunks. The health-checks may include utilizing storage metadata to determine if the portions of data have been corrupted, unintentionally altered, or otherwise inaccessible. If it is determined that a portion of data is corrupted or otherwise inaccessible, embodiments of the invention perform methods for reconstructing the corrupted or inaccessible portion of data by obtaining corresponding chunks from other data nodes in other fault domains. The storage metadata may subsequently be updated with the new storage location of the reconstructed portion of data. In this manner, the data cluster is up-to-date with the storage locations of data even after the data has been reconstructed and/or stored in a new storage location.

In traditional data clusters, a portion of data that is corrupted or inaccessible may not be reconstructed or health-checked until after a host, or other entity, attempts to access the data. At that point, the host, or other entity, would have to wait until the data has been reconstructed before accessing the data. Embodiments of the invention improve the traditional data clusters by proactively health-checking these portions of data before a host, or other entity, attempts to access the portions of data. Thus, latencies for accessing data are reduced.

Thus, embodiments of the invention may address the problem of inefficient use of computing resources. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
identifying a first chunk to be health-checked in a fault domain using storage metadata stored in the fault domain;
obtaining the first chunk from the fault domain;
generating, after obtaining the first chunk, a first chunk identifier using the first chunk;
making a determination that the first chunk identifier does not match a second chunk identifier stored in the storage metadata; and
in response to the determination:
obtaining a plurality of chunks associated with the first chunk from a plurality of fault domains, wherein the fault domain is not part of the plurality of fault domains;
regenerating the first chunk using the plurality of chunks to generate a new first chunk; and
storing the new first chunk in the fault domain;
updating the storage metadata of the fault domain based on storage of the new first chunk to obtain updated storage metadata; and
sending a first copy of the updated storage metadata to at least one of the plurality of fault domains; and
sending a second copy of the updated storage metadata to an accelerator pool, wherein the accelerator pool is operatively connected to the fault domain and the plurality of fault domains.

2. The method of claim 1, wherein the update specifies a storage location of the new first chunk.

3. The method of claim 1, wherein the storage metadata is stored in memory of a data node in the fault domain.

4. The method of claim 1, wherein the first chunk is a data chunk or a parity chunk.

5. The method of claim 1, wherein the fault domain comprises a plurality of data nodes, and wherein the first chunk is stored on a first data node of the plurality of data nodes.

6. The method of claim 5, wherein the identifying of the first chunk is performed by a second data node in the fault domain.

7. A non-transitory computer readable medium comprising computer readable program code, which when executed by a computer processor enables the computer processor to perform a method for managing data, the method comprising:
identifying a first chunk to be health-checked using storage metadata;
obtaining the chunk from a fault domain;
generating, after obtaining the chunk, a first chunk identifier using the first chunk;
making a determination that the first chunk identifier does not match a second chunk identifier stored in the storage metadata; and
in response to the determination:
obtaining a plurality of chunks associated with the first chunk from a plurality of fault domains;
regenerating the first chunk using the plurality of chunks to generate a new first chunk;
storing the new first chunk in the fault domain;
updating the storage metadata of the fault domain based on storage of the new first chunk to obtain updated storage metadata; and
sending a first copy of the updated storage metadata to at least one of the plurality of fault domains; and
sending a second copy of the updated storage metadata to an accelerator pool, wherein the accelerator pool is operatively connected to the fault domain and the plurality of fault domains.

8. The non-transitory computer readable medium of claim 7, wherein the update specifies a storage location of the new first chunk.

9. The non-transitory computer readable medium of claim 7, wherein the storage metadata is stored in memory of a data node in the fault domain.

10. The non-transitory computer readable medium of claim 7, wherein the first chunk is a data chunk or a parity chunk.

11. The non-transitory computer readable medium of claim 7, wherein the fault domain comprises a plurality of data nodes, and wherein the first chunk is stored on a first data node of the plurality of data nodes.

12. The non-transitory computer readable medium of claim 11, wherein the identifying of the first chunk is performed by a second data node in the fault domain.

13. A data cluster, comprising:
a non-accelerator pool comprising a plurality of data nodes;
wherein a data node of the plurality of data nodes comprises a processor and memory comprising instructions, which when executed by the processor perform a method, the method comprising:
identifying a first chunk to be health-checked in a fault domain using storage metadata stored in the fault domain, wherein the data node is in the fault domain;
obtaining the first chunk from the fault domain;
generating, after obtaining the chunk, a first chunk identifier using the first chunk;
making a determination that the first chunk identifier does not match a second chunk identifier stored in the storage metadata; and
in response to the determination:
obtaining a plurality of chunks associated with the first chunk from a plurality of fault domains, wherein the fault domain is not part of the plurality of fault domains, wherein the non-accelerator pool comprises the fault domain and the plurality of fault domains, and wherein the first chunk is a data chunk or a parity chunk;
regenerating the first chunk using the plurality of chunks to generate a new first chunk;
storing the new first chunk in the fault domain;
updating the storage metadata of the fault domain based on storage of the new first chunk to obtain updated storage metadata; and
sending a first copy of the updated storage metadata to at least one of the plurality of fault domains; and
sending a second copy of the updated storage metadata to an accelerator pool, wherein the accelerator pool is operatively connected to the fault domain and the plurality of fault domains.

14. The data cluster of claim 13, wherein the update specifies a storage location of the new first chunk.

* * * * *